United States Patent
Sorrentino et al.

(10) Patent No.: US 8,330,980 B2
(45) Date of Patent: Dec. 11, 2012

(54) SYSTEM, METHOD, AND APPARATUS FOR NETWORKED PRINT MANAGEMENT

(75) Inventors: Daniel G. Sorrentino, Avon, NY (US);
Michelle Bremner, Hilton, NY (US);
Michael Alexander, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 693 days.

(21) Appl. No.: 12/328,504

(22) Filed: Dec. 4, 2008

(65) Prior Publication Data
US 2010/0141983 A1    Jun. 10, 2010

(51) Int. Cl.
*G06F 3/12*    (2006.01)
*G06K 15/00*    (2006.01)

(52) U.S. Cl. .............. 358/1.15; 358/1.14; 358/1.16; 358/1.13

(58) Field of Classification Search .......... 358/1.11–1.16
See application file for complete search history.

(56) References Cited

U.S. PATENT DOCUMENTS

| | | | |
|---|---|---|---|
| 6,160,629 A * | 12/2000 | Tang et al. | 358/1.1 |
| 2004/0213615 A1* | 10/2004 | Nakao | 400/76 |
| 2005/0094182 A1* | 5/2005 | Reese et al. | 358/1.14 |
| 2005/0210259 A1* | 9/2005 | Richardson | 713/179 |
| 2008/0212131 A1* | 9/2008 | Osada | 358/1.15 |
| 2009/0021778 A1* | 1/2009 | Wei | 358/1.15 |

\* cited by examiner

*Primary Examiner* — Dov Popovici
(74) *Attorney, Agent, or Firm* — MH2 Technology Law Group LLP

(57) ABSTRACT

A system, method, and apparatus for networked print management without the presence of print servers. The system, method, and apparatus allow a user to submit documents to a multifunction device for printing. The multifunction device (MFD) is in communication with one or more other MFDs over an application server. The application server acts as a request broker to allow one MFD to print a document on another MFD. The user accesses the MFD to view the submitted documents. The one or more other MFDs send any additional documents to the accessed MFD. The user selects one or more of the user's documents for printing by the accessed MFD. The user can also select the user's documents on the accessed MFD and forward them to a second MFD for printing.

12 Claims, 7 Drawing Sheets

SYSTEM, METHOD, AND APPARATUS FOR NETWORKED PRINT MANAGEMENT

FIELD

This invention generally relates to print management systems and methods.

BACKGROUND

Print management systems can be valuable for user convenience and document security. In a specified work area, multiple multifunction devices (MFDs) can be set up in different locations and connected to each other via a dedicated print server. MFDs are devices that are capable of performing a variety of office functions, including printing, copying, faxing, scanning, and/or the like. In print management systems generally, multiple user personal computers (PCs) can be connected to one or more MFDs to allow users to access and submit documents to the one or more MFDs. Operating the user PCs, a user can designate which MFD is to be used to print a document.

After a user submits one or more documents to a specified MFD, the user can log into that MFD via a user interface at the MFD to view a list of the submitted documents. The user can choose to print one or more of the submitted documents, and the MFD can print the documents that the user chooses.

However, known print management systems involve certain drawbacks. Some of those disadvantages are related to the fact that the overall queue of print jobs containing all pending print jobs transmitted to all MFDs is typically stored in a dedicated print server, but not in individual MFDs or other print devices. Moreover, any local print queues inserted in individual MFDs are not configured to communicate with other MFDs. This restricted architecture can prove to be burdensome and inconvenient for users, for example in situations where many users submit documents to only a few of the available MFDs. In that situation, the few high-use MFDs can be overloaded with incoming documents from multiple users who lack any way to redirect their print jobs from an overloaded MFD to an unused MFD, or otherwise manage the local queue in conjunction with other devices.

Further, many companies and groups prefer not to use print servers in their local area networks. Because the functionality of the proposed invention has been print server dependent in the past, the proposed invention allows a print job submitted to one device to be printed on another without print servers.

SUMMARY

An embodiment of the present teachings is directed to a print management system, including an application server in communication with one or more multifunction or other devices each capable of being configured with a distributed print queue module. The population of distributed print queue modules can be configured to store a queue of incoming documents directed to each respective output device. In embodiments, a user can redirect his or her pending documents in the local print queue of one MFD to or from another MFD.

Another embodiment is directed to a method of managing printing. The method includes providing a multifunction device. The method also includes receiving original documents submitted by a user to be printed at the multifunction device; polling by the invention's application server of one or more other multifunction devices (MFDs) for additional documents submitted by the user; and receiving the additional documents from the one or more other multifunction devices.

Another embodiment is directed to an apparatus for managing printing. The apparatus includes an accessed multifunction device and one or more other multifunction devices in communication with each other via a network or application server. The apparatus also includes a document storage device configured to locally store original documents submitted by a user to be printed at the accessed multifunction device, and a print queue module stored on the accessed multifunction device. The print queue module is configured to request and receive additional documents submitted by the user to be printed at the one or more other multifunction devices.

BRIEF DESCRIPTION OF THE DRAWINGS

The accompanying drawings, which are incorporated in and constitute a part of this specification, illustrate embodiments of the present disclosure and together with the description, serve to explain the embodiments.

DETAILED DESCRIPTION

Figure 1A:
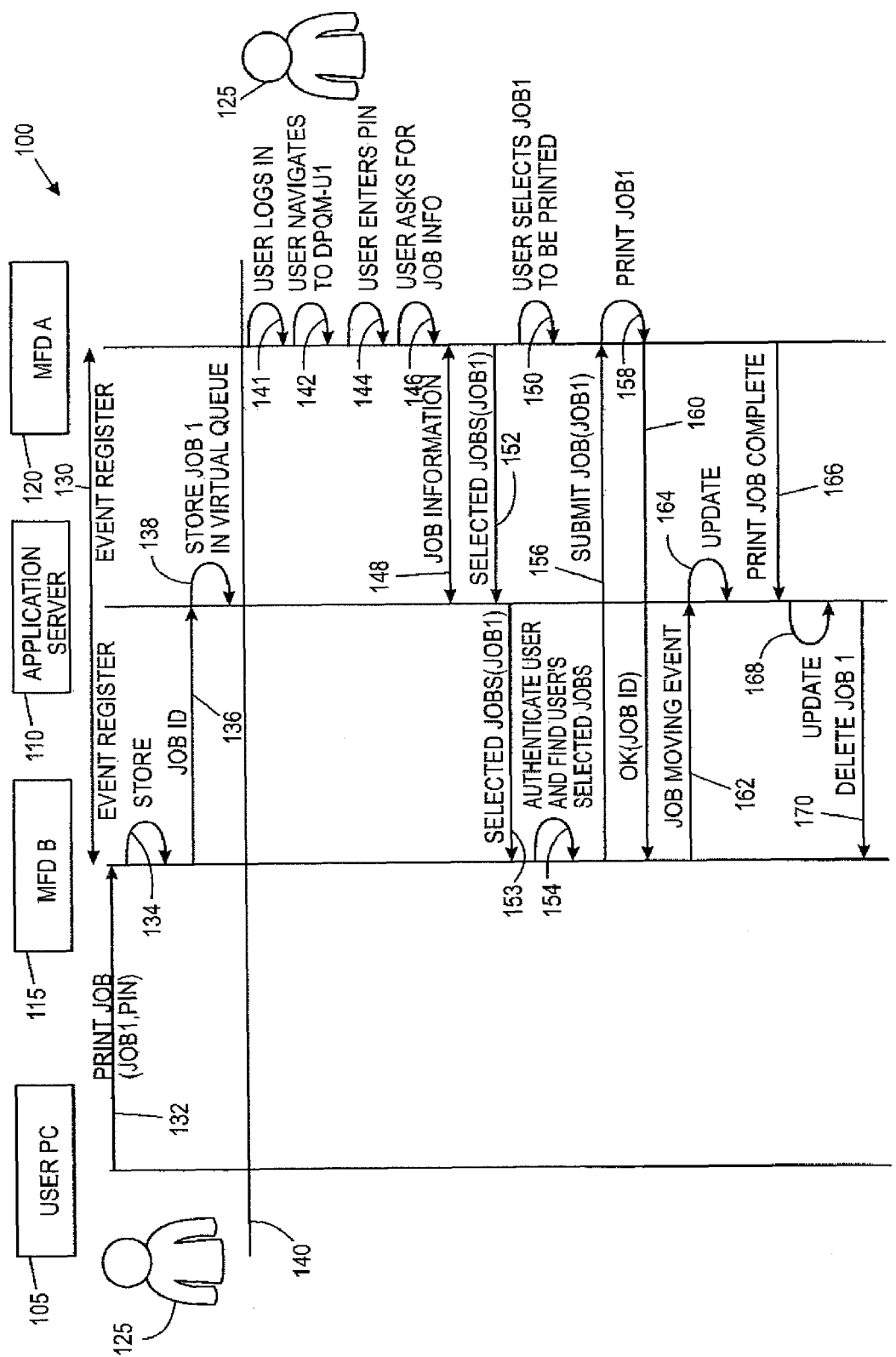
FIG. 1A is a diagram illustrating an overview of an exemplary print management system.

Embodiments of the present teachings are directed towards a print management system. The print management technology allows for more convenient and secure physical document retrieval. The authentication and document exchange of the system can be managed by a remote application server. Because there is no requirement for intermediate storage, and all the necessary logic and security can be performed by the application server and by a distributed print queue module (DPQM) on the MFDs, embodiments of the present teachings can be implemented without a print server or other intermediate storage between MFDs and client terminals.

The print management system allows a user to print from an MFD a document submitted to any MFD in communication with the application server, including from an MFD to which a user did not originally submit a document for printing. The print management system can allow the multiple MFDs to communicate with each other via a network and/or the application server. The documents that the users submit to an MFD are tracked by and stored in a distributed print queue module (DPQM) stored on the respective MFD. Each MFD therefore maintains its own DPQM, and each DPQM can access the DPQMs of the other MFDs in communication with the application server. Additionally, MFDs can notify the application server of the arrival of print jobs submitted by any user, which eliminates the performance overhead of polling. As a result, the application server can maintain a distributed print queue, which can be shared amongst participating devices.

The application server can be implemented on or as a web site, a server on a private network or local intranet, or other local or remote hardware, software, or logic. The application server can be configured to communicate with one or more MFDs. Although a user's PC or other client need not be in communication with all of the MFDs, the application server can be configured to retrieve a document from one MFD and send it to another MFD to which the user PC is not connected. As such, the application server can serve as a gateway by which documents can be transferred among MFDs. The application server can also command one MFD to send a job to another MFD. Incorporating MFDs can have the capability to move jobs amongst themselves upon receipt of a command from the application server.

When a user accesses the user interface on a given MFD, the user can for example either print the documents that the user originally submitted to that MFD, or the user can retrieve and print any documents that the user originally submitted to any of the other MFDs via a mediation role of the application server. Furthermore, the user can send the documents that the user originally submitted to that MFD to another MFD in communication with the application server to be printed.

A plurality of MFDs are in communication with each other via a network, and can each communicate with the application server. A plurality of user PCs or other clients or devices can each be in communication with one or more of the plurality of MFDs. The MFDs can each be remotely located throughout multiple physical locations within a building, office space, campus, and/or the like. In embodiments, the application server can be set up over a network. The network can comprise a local area network (LAN), such as an Ethernet™ network, or a wired, wireless, or optical network, or combinations of such networks. In embodiments, the network can be or include the Internet, or other public or private networks or connections.

According to embodiments, when a user submits a document for printing from a user PC, the user PC sends the document to an identified MFD that the user specified during the submission of the document. A user can access a list of submitted documents on a user interface at the MFD, to select and print one or more of the submitted documents.

The DPQM can be integrated into each of the MFDs and be in communication with the application server. A user can designate whether a document to be printed is sent to the DPQM. At the user interface of one MFD, the user can have the DPQM of that one MFD communicate with the application server to list job information for additional documents submitted by the user for printing to all the MFDs managed by the application server. The DPQM of the one MFD can receive information associated with the additional documents, and the user can then select and print any documents sent by the user to any MFD in communication with the application server.

Reference will now be made in detail to the exemplary embodiments of the disclosure, an example of which is illustrated in the accompanying drawings. Wherever possible, the same reference names and numbers will be used throughout the drawings to refer to the same or like parts.

In the following description, reference is made to the accompanying drawings that form a part thereof, and in which is shown by way of illustration-specific exemplary embodiments. These embodiments are described in sufficient detail to enable those skilled in the art to practice the embodiments and it is to be understood that other embodiments can be used and that changes can be made without departing from the scope of this disclosure. The following description is, therefore, merely exemplary.

FIG. 1A is a general overview of a Distributed Print Queue print management system 100 consistent with embodiments. Print management system 100 includes a user personal computer (PC) 105, an MFD B 115, an MFD A 120, and an application server 110. One skilled in the art will realize that the components and functionality thereof as illustrated in FIG. 1A are exemplary and that print management system 100 can include additional components, including additional user PCs and MFDs.

User PC 105 can be configured for operation by a user. Further, user PC 105 can include a computing system to allow the user to submit a document for printing. User PC 105 can further include the necessary hardware, software, network connections, print drivers, and combinations thereof to allow the user to create, store, receive, and/or submit for printing a document. For example, user PC 105 can include a computer platform and input/output devices (not shown in figures) coupled to the computer platform. The input/output devices can include, for example, a keyboard, mouse, and/or the like.

User PC 105 can be configured to allow a user to draft documents, open files, and/or other similar tasks common to PC operation. For example, the user can use a word processor program to create a document. User PC 105 can be further configured to allow a user to send a print request for word-processed documents, pictures, and/or other similar files. For example, a user can submit a document created on user PC 105 to a print driver to create a driver document with correct parameter settings, including requiring a PIN to be entered, to allow the receiving MFD to enter the document into the Distributed Print Queue workflow exemplified in FIG. 1A.

Each of MFD B 115 and MFD A can be configured to receive a print request from user PC 105. For example, each of MFD B 115 and MFD A can receive a driver document from user PC 105. The print request can indicate which MFD at which the document is to be printed. Application server 110 can be configured to communicate with MFD B 115 and MFD A 120, and any other MFD within a network. Each of MFD B 115 and MFD A can be further configured to send the document to the application server 110. Application server 110 can be configured to receive the document and send the document to another specified MFD. For example, application server 110 can receive a document from MFD B 115 and send it to MFD A 120.

Each of MFD B 115 and MFD A can be configured to receive the document from user PC 105. For example, MFD B 115 can receive a driver document from user PC 105. Each of MFD B 115 and MFD A can be further configured with a means for user interaction. Still further, each of MFD B 115 and MFD A can be configured to communicate with each of the other MFDs either through application server 110 or directly with each other after receiving a command from application server 110. For example, MFD B 115 can send driver documents to and receive driver documents from MFD A 120 over application server 110 or MFD A 120 can be commanded by application server 110 to send a document to MFD B 115. Finally, each of MFD B 115 and MFD A can be configured to print out the document, picture, and/or the like sent by user PC 105 or received from application server 110.

As shown in FIG. 1, in step 130, application server 110 can be configured to communicate with MFD B 115 and MFD A 120. A user 125 operating at user PC 105 can submit a document and a PIN to MFD B 115. In step 132, MFD B 115 can receive a request to print Job1 from user PC 105. In step 134, MFD B can store Job1. In step 136, MFD B can forward the Job ID, user ID, secure PIN, and other identifying information to the application server 110. In step 138, application server 110 can store the job ID, user ID, secure PIN, and other identifying information of Job1 in a virtual queue. The Job ID is a composite attribute which can contain the job identifier of the job on the MFD that sends it, and the IP_Address and Name of the sending MFD, and user identification attributes, such as, for example, a personal identification number or fully qualified user name, the name of the document, the time the document was submitted, and other attributes.

Step 140 represents user 125 relocating to a user interface of MFD A 120. In step 141, the user logs into MFD A. In step 142, user 125 can navigate to the user interface (UI) of a DPQM of MFD A 120. In step 144, user 125 can enter a unique PIN which identifies user 125. In embodiments, each user can have a PIN so that connected MEDs will only query print jobs submitted by that user after the user connects to the MFD. After user 125 successfully enters the PIN into the DPQM UI of MFD A 120, in step 146, user 125 can ask for job information for print jobs submitted by user 125 to the MFDs connected to application server 110. In step 148, MFD A 120 can query application server 110 for job information for print jobs submitted to be printed at any MFD by user 125, and this information can then be returned to MFD A 120. In step 150, user 125 can select Job1 to be printed. In step 152, MFD A 120 can send a request to application server 110 to forward the identifying data of Job1. In step 153, application server 110 can send a request to MFD B 115 to forward the data and the document contained in Job1 back to MFD A where user 125 is located. In step 154, MFD B 115 can authenticate user 125 based on the entered PIN and search for Job1 of user 125.

In step 156, MFD B 115 can send Job1, including the document to be printed, to MFD A 120. In step 158, MFD A 120 can print Job1. In step 1601 MFD A 120 can tell MFD B 115 through application server 110 the job ID of Job1. In step 162, MFD B 115 can relay to application server 110 to update the job IDs stored on application server 110. In step 164, application server 110 can update its job IDs to reflect that Job1 has been printed. In step 166, MFD A 120 can relay to application server 110 that Job1 has been successfully printed. In step 168, application server 110 can update its queue. In step 170, application server 110 can send a delete Job1 request to MFD B 115.

Figure 1B:
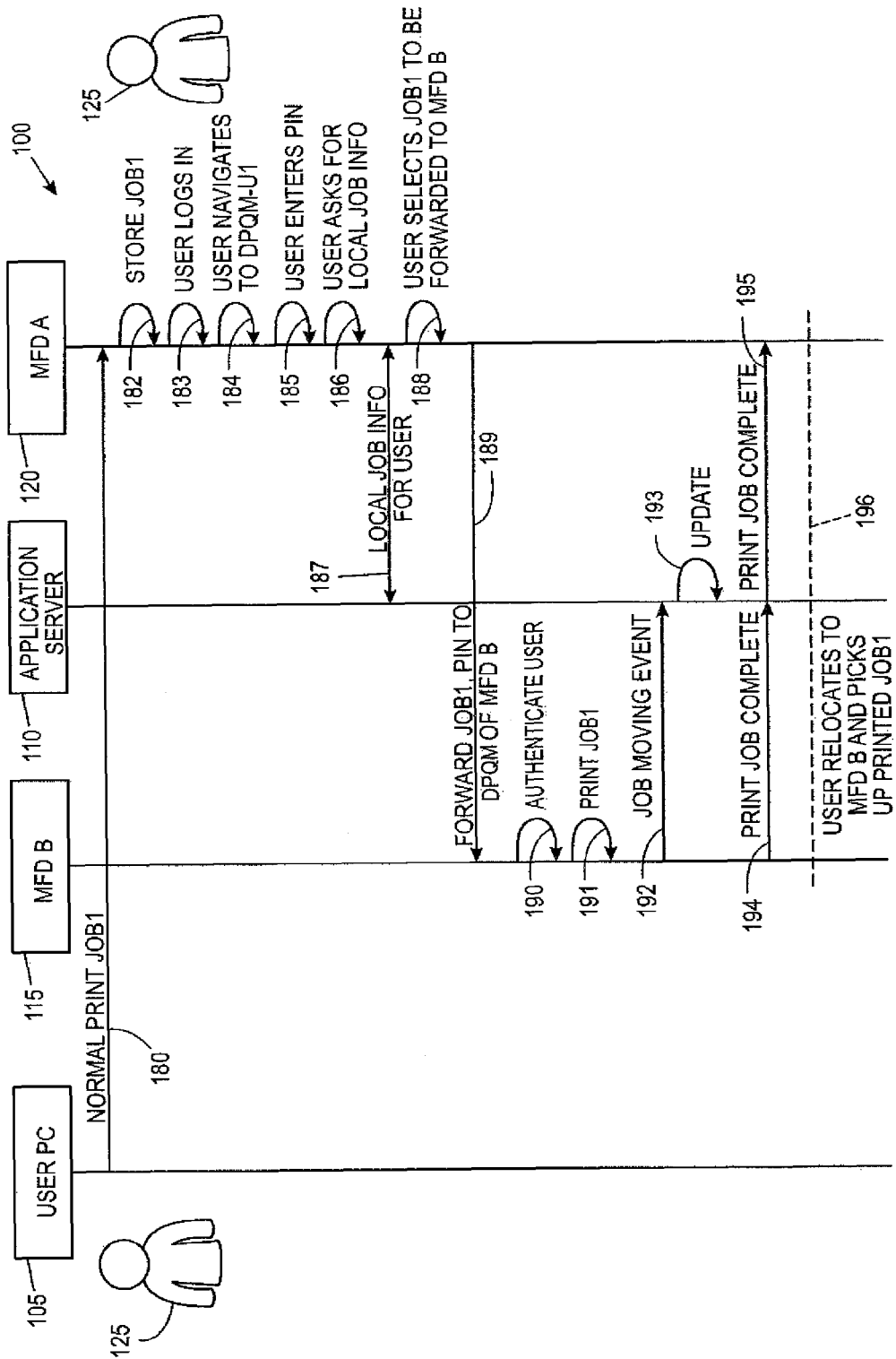
FIG. 1B is a diagram illustrating an overview of an exemplary print management system.

FIG. 1B is a general overview of a Distributed Print Queue print management system consistent an embodiment. The difference between FIG. 1B and FIG. 1A is that in the system of FIG. 1B, a unique PIN is entered at the MFD rather than at the user PC, as it is in system 100 of FIG. 1A. Print management system includes user PC 105, MFD B 115, MFD A 120, application server 1101 and user 125 as shown in FIG. 1A. One skilled in the art will realize that the components and functionality thereof as illustrated in FIG. 1B are exemplary and that print management system can include additional components, including additional user PCs and MFDs. Further, user PC 1051 MFD B 115, MFD A 120, application server 110, and user 125 as shown comprise the same functionality as previously described.

In step 180, user 125 at user PC 105 can submit a normal print job (Job1) to MFD A 120 that is not specified to be part of the DPQM of the present invention. In the present embodiment, user 125 does not enter a PIN when submitting Job1 for printing. For example, user 125 may want to submit a print document for local printing only at the specified MFD. In step 182, MFD A 120 stores Job1. In step 183, user 125 can relocate to MFD A and logs into MFD A 120. In step 184, user 125 can navigate to the DPQM user interface (UI) of MFD A 120 and enter a unique PIN, in step 185. User 125 can ask for print job information local to MFD A 120, in step 186.

In step 187, MFD A 120 can receive the local print job information from application server 110. In step 188, user 125 can select Job1 to be forwarded to MFD B 115 connected to application server 110. In step 189, MFD A 120 can forward Job1 and the PIN to the DPQM of MFD B 115. In step 190, MFD B 115 can authenticate user 125. In step 191, MFD B 115 can print Job1. In step 192, MFD B 115 can inform application server 110 of a job moving event, and correspondingly, application server 110 can update the job IDs stored on application server 110, in step 193. In step 194, MFD B 115 can relay to application server 110 of the completed print job. In step 195, application server 110 can relay to MFD A 120 of the completed print job. In step 196, user 125 can relocate to MFD B and pick up printed Job 1.

Figure 2:
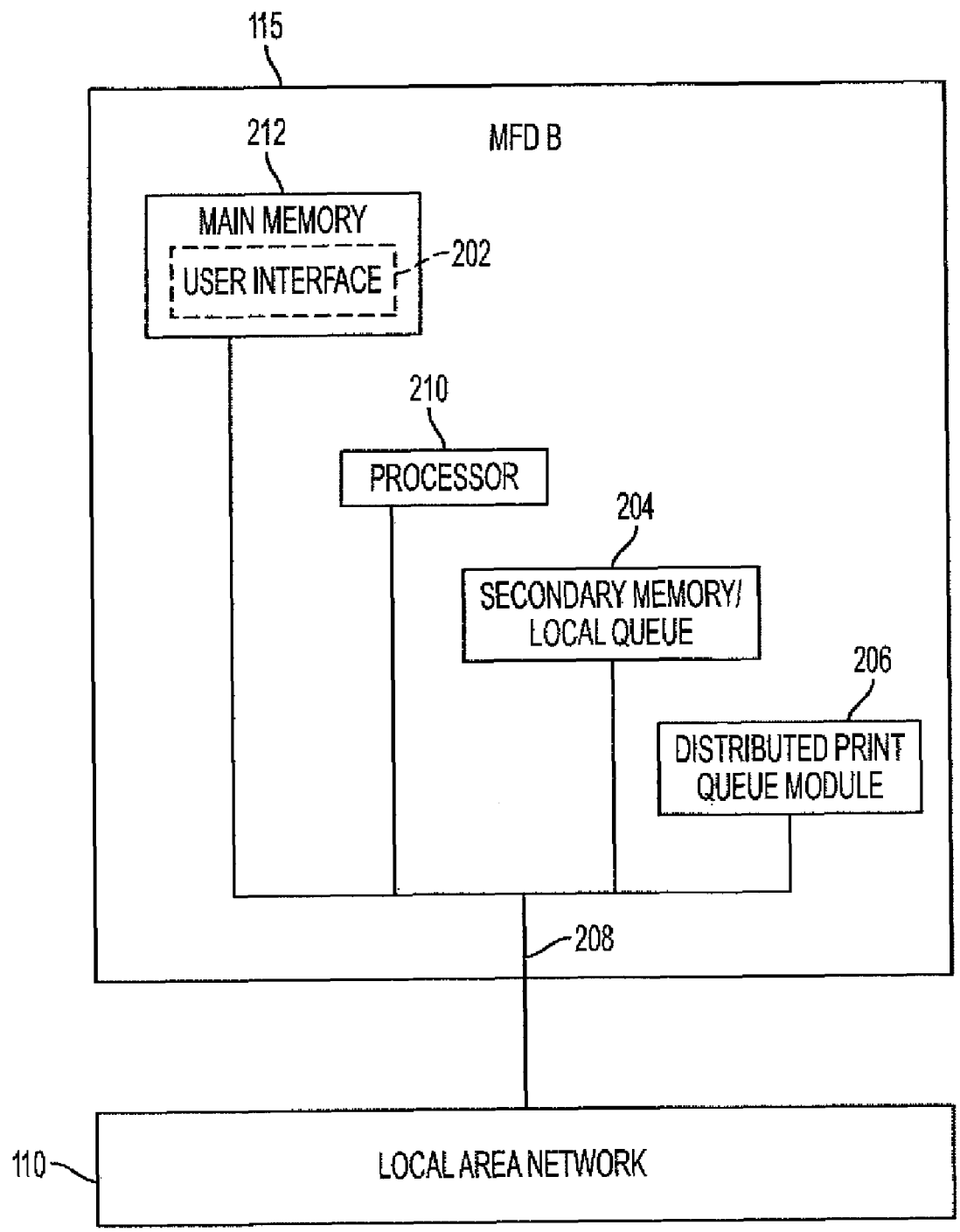
FIG. 2 is a diagram illustrating an exemplary MFD according to embodiments.

FIG. 2 illustrates a more detailed overview of MFD B 115. In embodiments, the components of MFD B 115 can be consistent across each of the other MFDs in communication with the application server 110, or configurations of those devices can differ. MFD B 115 includes a user interface 202, a secondary memory/local queue 204, and a DPQM 206. MFD B 115 can be interfaced with application server 110 through a communication bus 208.

MFD B 115 can include one or more processors, such as processor 210 that can provide an execution platform for embodiments of user interface 202. Processor 220 can be, for example, a central processing unit (CPU), a micro-controller unit (MCU), digital signal processor (DSP), or the like. Commands and data from processor 210 are communicated over communication bus 208. MFD B 115 also includes a main memory 212, such as a Random Access Memory (RAM), where user interface 202 can be executed during runtime. Additionally, an operating system (OS) such as a version of Windows™ or others from MICROSOFT® can be executed on main memory 212 during runtime.

Secondary memory/local queue 204 can include, for example, a hard disk drive (not shown) and/or a removable storage drive (not shown), representing a floppy diskette drive, a magnetic tape drive, a compact disk drive, etc., where a copy, whole or in part, of a computer program embodiment for user interface 202 can be stored. For example, user interface 202 can be stored in secondary memory/local queue 204 and, during runtime, user interface 202, whole or in part, can be loaded into main memory 212.

Secondary memory/local queue 204 can be further configured to store documents received from application server 110. For example, secondary memory/local queue 204 can receive a driver document from application server 110 and store that driver document until a user requests to print it. The documents stored in secondary memory/local queue 204 are those that are originally submitted to be printed on the appropriate MFD. For example, secondary memory/local queue 204 as shown in FIG. 2 stores driver documents designated to be printed on MFD B 115.

User interface 202 can be any type of application capable of implementing the functionality of an MFD. For example, user interface 202 can be a standalone application designed to solely designate the MFD to print, fax, scan, or copy. User interface 202 can be written in program code and executed by MFD 115. User interface 202 can be implemented in computer languages such as PASCAL, C, C++, JAVA, HTML, XML and the like. One skilled in the art will realize that the components, functions, and methods described above and below can be implemented in any computer language and any application capable of implementing user interface 202.

User interface 202 can be embodied in secondary memory/local queue 204 and/or main memory 212 (as illustrated) as instructions for causing MFD B 115 to perform the instructions. Secondary memory/local queue 204 and main memory 212 can include computer readable signals, in compressed or uncompressed form. Exemplary computer readable signals, whether modulated using a carrier or not, are signals that a computing system can be configured to access, including signals downloaded through the Internet or other networks. Concrete examples of the foregoing include distribution of executable software programs of the computer program on a CD-ROM or via Internet download. In a sense, the Internet itself, as an abstract entity, is a computer readable medium. The same is true of computer networks in general.

User interface 202 can be configured to receive from the user PCs information associated with documents to be printed. Further, user interface 202 can be configured to display the status of the print jobs on print management system 100. User interface 202 can be configured to allow a user to navigate through the various commands and windows via a touch screen (not shown in figures). In an embodiment, a keyboard, mouse, and/or other similar peripheral device (not shown in figures) can be interfaced with user interface 202 to allow a user to navigate through the various commands and windows.

DPQM 206 can support the display in the local user interface, communicate with application server 110, and communicate with other DPQMs of other participating MFDs. DPQM 206 of MFD B 115 can be configured to communicate with each of the other MFDs connected over application server 110. More particularly, DPQM 206 of MFD B 115 can be configured to communicate with each of the DPQMs and the secondary memory/local queues of each of the other MFDs connected over application server 110. For example, DPQM 206 of MFD B 115 can send and receive information to and from the DPQM and the secondary memory/local queue of MFD A 120. The information can include document data originally submitted to the respective MFD. For example, DPQM 206 of MFD B 115 can obtain the driver documents stored on the secondary memory/local queue of MFD A 120, those which a user originally submitted to be printed on MFD A 120. Further, for example, the DPQM of MFD A 120 can obtain any print status information stored on DPQM 206 of MFD B 115, the information relating to any documents which a user originally submitted to be printed on MFD B 115.

Figure 3:
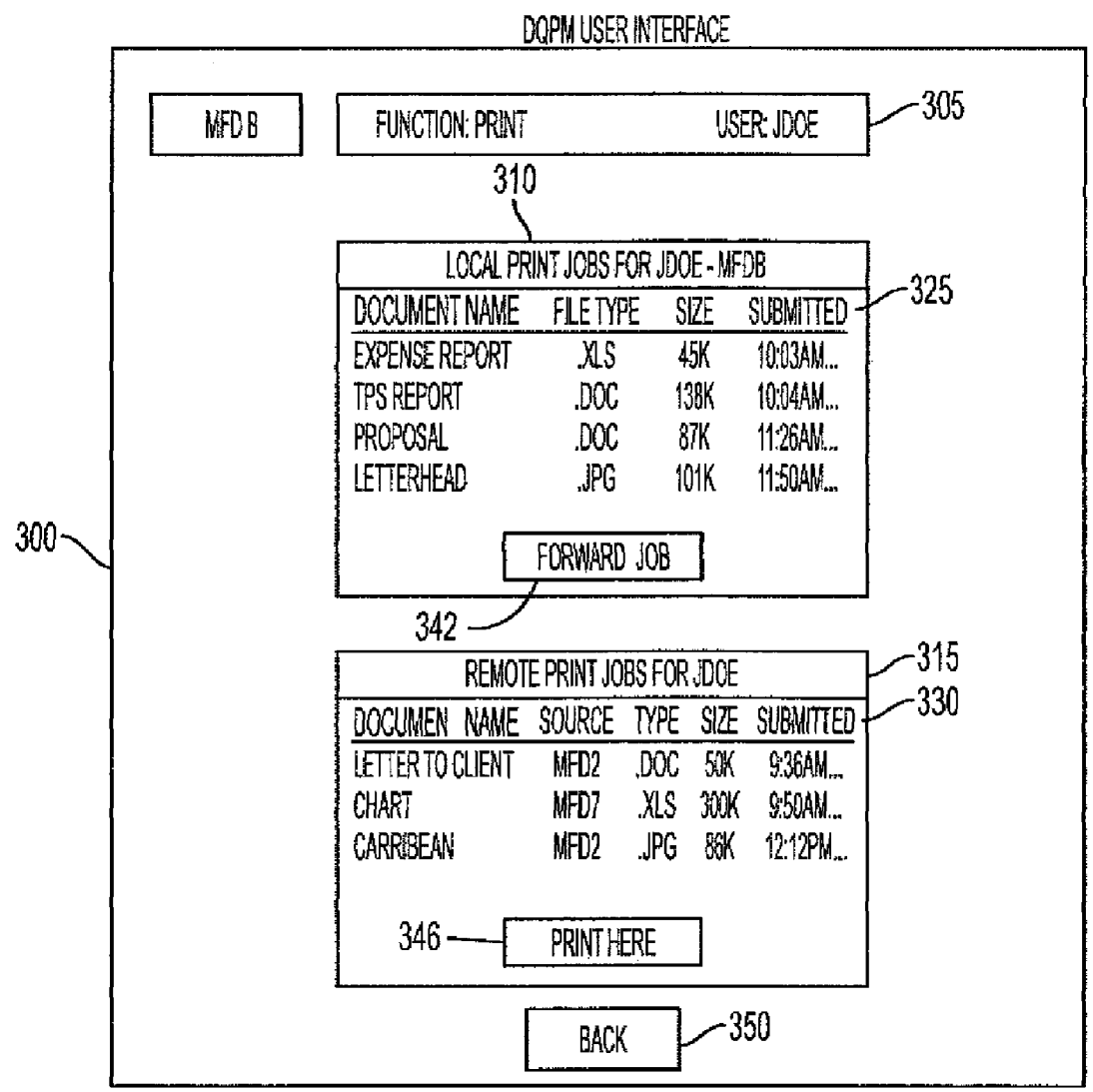
FIG. 3 is a diagram illustrating an exemplary interface according to embodiments.

FIG. 3 shows an exemplary user print interface 300 to be utilized at each of the MFDs connected over application server 110. It should be appreciated that user print interface 300 is merely exemplary and can be modified so as to still perform the similar functions of print management system 100. Further, it should be appreciated that FIG. 3 shows user print interface 300 as implemented on MFD B 115, but user print interface 300 can be similarly implemented at each of the other MFDs connected over application server 110. Still further, exemplary user print interface 300 can be accessed on a web browser or other software executing or hosted on each respective MFD.

Before user print interface 300 displays on user interface 202 of MFD B 115, it is assumed that a user has logged into user interface 202 of MFD B 115. The logging-in function is in place such that a user can only access the jobs that the user has submitted to the MFDs connected to application server 110. The user can log into the user interface by entering a PIN or a similar unique identifier. After the user enters the correct PIN, the corresponding MFD can authenticate the user and allow the user to access user print interface 300. In embodiments, the user can then execute different functions including, for example, asking for print job information relating to jobs submitted to the MFDs connected to application server 110.

User print interface 300 can be configured to display on user interface 202 of each of the MFDs connected over application server 110. User print interface 300 includes a local print window 310 and a networked print window 315. Further, user print interface 300 can include a title bar 305 and a back button 350. Title bar 305 can display the currently selected function of the accessed MFD and the current user of the accessed MFD. For example, as shown in FIG. 3, title bar 305 can display that the selected function is "PRINT" and that the current user is "JDoe". Back button 350 can allow the user to navigate through the different functions of the MFD. For example, the user can select back button 350 to navigate to a page allowing the user to select the fax, scan, copy, or logout functions of the MFD.

Local print window 310 can be configured to display the local, non-DPQM documents submitted by the logged-in user to be printed at the accessed MFD. For example, local print window 310 as displayed on user interface 202 of MFD 115 can display all of the non-DPQM documents submitted by JDoe to be printed at MFD 115. In the preferred embodiment, local print window 310 can be configured to display documents not marked for the DPQM. Local print window 310 can be further configured to display additional document information received from secondary memory/local queue 204 of the accessed MFD.

Local print window 310 can include a local detail list 325 and a forward job button 342. In embodiments, when a user selects forward job button 342, user print interface 300 can activate the functionality as shown in FIG. 1B. Local detail list 325 can organize file attributes of the documents displayed in local print window 310 of the accessed MFD. For example, local detail list 325 can configure local print window 310 to list the document name, file type, size, time submitted, and/or any other common file attributes of the local print documents.

Local print window 310 can be further configured to allow a user to select or unselect one or more of the listed local documents to be printed. A user can select or unselect one or more of the documents by, for example, using the touch screen, mouse, keyboard, and/or the like.

Forward job button 342 can be configured to allow a user to send a local, non-DPQM document to application server 110 to be printed at an MFD. The user can select one or more of the documents listed in local print window 310 and then select forward job button 342 to send the one or more documents to another MFD to be printed. User print interface 300 can be configured to allow the user to choose which MFD to send the local document. For example, the user can send to MFD A 120 a document originally submitted to be printed at MFD B 115. To successfully send a local print job to application server 110, the user will be required to enter a PIN, since these are jobs that were not originally submitted with a PIN at the print driver.

Networked print window 315 can be configured to display the networked, DPQM-enabled documents submitted by the logged-in user to be printed at the networked MFDs. For example, networked print window 315 as displayed on user interface 202 of MFD B 115 can display the documents submitted by JDoe to be printed on MFD A 120, MFD B 115, etc.

Networked print window 315 can include a networked detail list 330 and a print here button 346. In embodiments, when a user selects print here button 346, user print interface 300 can activate the functionality as shown in FIG. 1A. Networked detail list 330 can organize file attributes of the networked documents displayed in networked print window 315 of the accessed MFD. For example, networked detail list 330 can configure networked print window 315 to list the document name, file type, size, time submitted, and/or any other common file attributes of the networked documents to be printed.

Networked print window 315 can be further configured to allow a user to select or unselect one or more of the listed networked print documents. A user can select or unselect one or more of the documents by, for example, using the touch screen, mouse, keyboard, and/or the like.

Print here button 346 can be configured to allow a user to print a document submitted to an MFD connected over application server 110. The user can select one or more of the documents listed in networked print window 315 and then select print here button 346 to print the documents at the logged-in MFD. For example, at the user interface of MFD B 115, the user can print a document originally submitted to be printed at MFD A 120.

Figure 4:
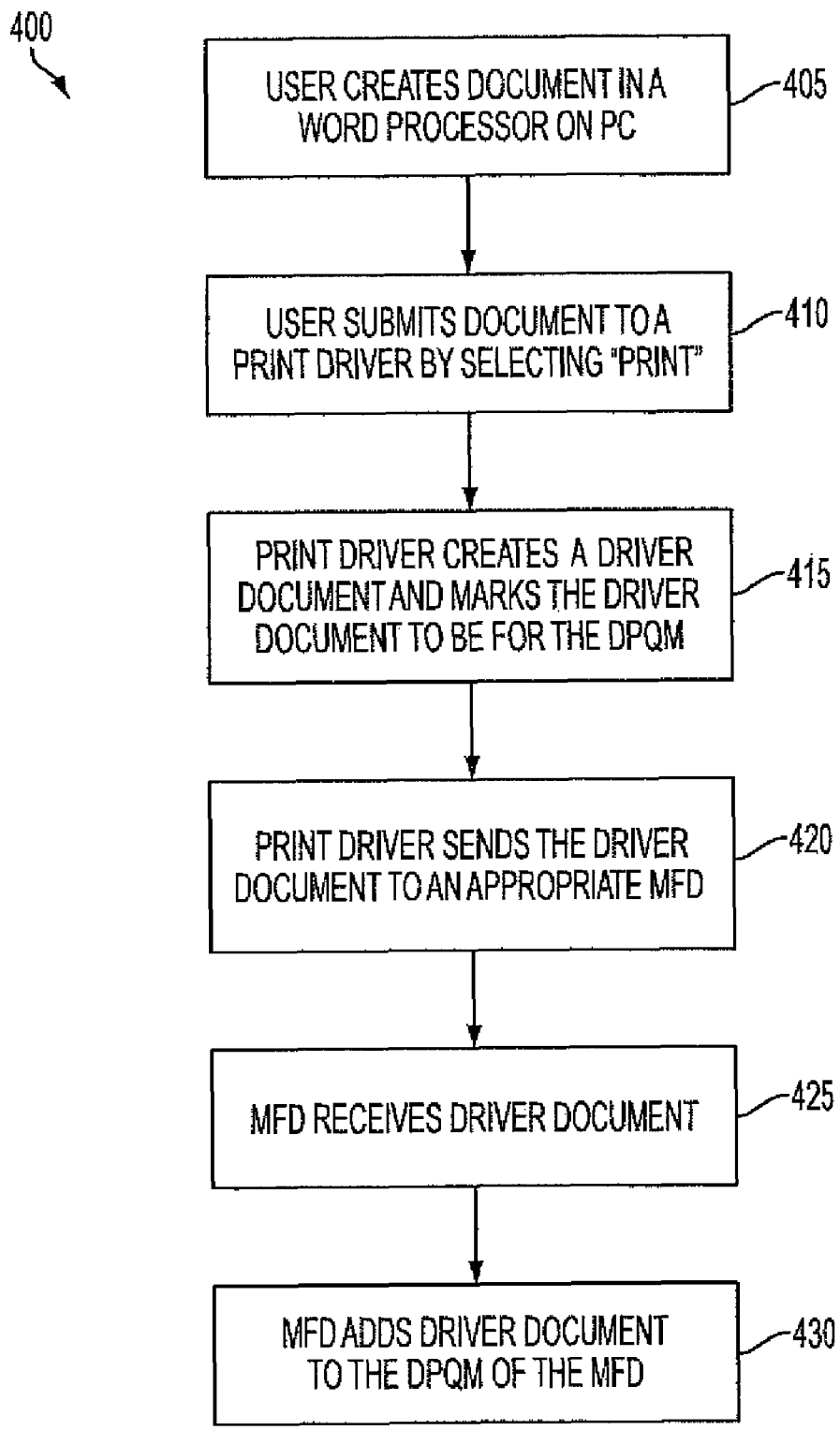
FIG. 4 is a diagram illustrating a process of submitting a document to a DPQM of an MFD.

FIG. 4 is a flow diagram illustrating a process 400 of submitting a print job to an MFD. Process 400 can be performed by a user situated at one of user PCs 105 and proceeds to one of the MFDs connected over application server 110 as described above in FIGS. 1, 2, and 3. It should be readily apparent to those of ordinary skill in the art that the diagram depicted in FIG. 4 represents a generalized illustration and that other steps may be added or existing steps can be removed or modified.

Process 400 begins when a user creates a document in a word processor or similar document creating, accessing and/or editing program on one of user PCs 105, in step 405. The user submits the document to a print driver by selecting a "print" function on one of user PCs 105 and by specifying the preferred MFD connected over application server 110, in step 410. The print driver creates a driver document from the submitted document and marks the driver document to be for DPQM 206, in step 415. The print driver sends the driver document to the appropriate MFD, in step 420. The appropriate MFD receives the driver document, in step 425. The appropriate MFD adds the driver document to DPQM 206 of the appropriate MFD, in step 430.

Figure 5:
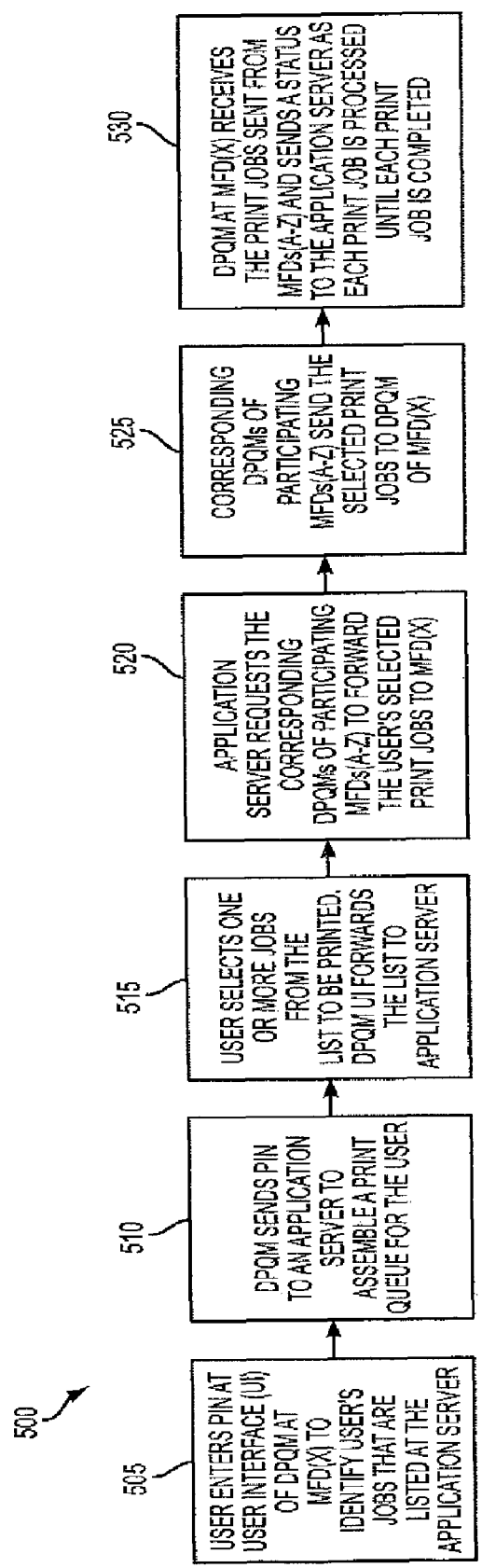
FIG. 5 is a diagram illustrating a process of printing a document on an MFD that was originally submitted to a different MFD.

FIG. 5 is a flow diagram illustrating a process 500 of printing from one MFD a document originally submitted to be printed at another MFD. Process 500 can be performed by a user logged into one of the MFDs connected over application server 110, as for example described above in FIGS. 1, 2, and 3. It should be readily apparent to those of ordinary skill in the art that the diagram depicted in FIG. 5 represents a generalized illustration and that other steps may be added or existing steps can be removed or modified.

Process 500 begins when a user enters a PIN at user interface 202 of DPQM 206 at MFD(X) to identify the user's jobs that are listed at the application server, in step 505. DPQM 206 sends the PIN to application server 110, which assembles a print queue list for that user, in step 510. The user selects one or more print jobs from the print queue list to be printed, and the DPQM 206 of MFD(X) forwards the list to application server 110, in step 515. Application server 110 requests the corresponding DPQMs of participating MFDs(A-Z) to send the selected print jobs to DPQM 206 of MFD(X), in step 520.

The corresponding DPQMs of the participating MFDs(A-Z) send the selected print jobs to DPQM 206 of MFD(X), in step 525. DPQM 206 of MFD(X) receives the print jobs sent from the participating MFDs(A-Z) and sends a status to the application server 110 as each print job is processed until each print job is completed, in step 530. Subsequently, process 500 ends.

Figure 6:
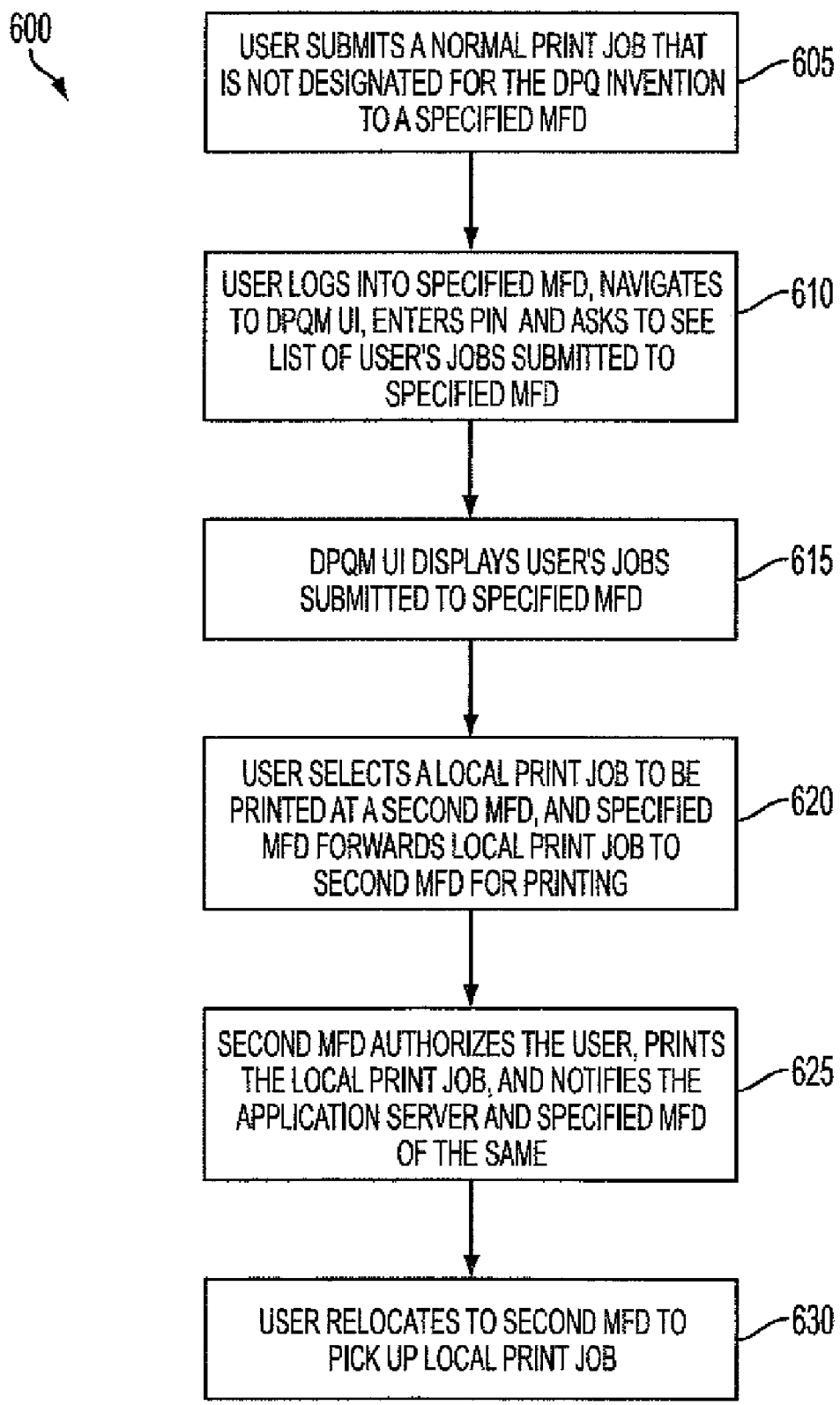
FIG. 6 is a diagram illustrating a process of forwarding a local document to an MFD.

FIG. 6 is a flow diagram illustrating a process 600 of forwarding a local print document to an MFD connected to application server 110. Process 600 can be completed by a user logged into one of the MFDs connected over application server 110, as for example described above in FIGS. 1, 2, and 3. It should be readily apparent to those of ordinary skill in the art that the diagram depicted in FIG. 6 represents a generalized illustration and that other steps may be added or existing steps can be removed or modified.

Process 600 begins when a User submits a normal print job that is not designated for the distributed print queue to a specified MFD, in step 605. The User can log into the specified MFD, navigate to the DQPM user interface (UI) of the specified MFD, enter a unique PIN, and ask to see a list of the User's jobs submitted to the specified MFD, in step 610. The DPQM UI can display the User's jobs submitted to the specified MFD, in step 615.

The User can select a local print job such as, for example, Job1, to be printed at a second MFD, and the specified MFD can forward Job1 to the second MFD for printing, in step 620. The second MFD can authorize the user from the submitted PIN, print Job1, and notify the application server and the specified MFD that Job1 is printed, in step 625. The User can relocate to the second MFD to pick up Job1, in 630.

The foregoing description is illustrative, and variations in configuration and implementation may occur to persons skilled in the art. For example, while embodiments have been described in which a set of MFDs are connected via a single application server, in embodiments multiple sets of MFDs can communicate via two or more application servers. For further example, while embodiments have been described in which one document is transmitted to a single MFD for printing one time, in embodiments one or more documents can each be sent to multiple MFDs for to print multiple copies of documents at the same or different times. Other resources described as singular or integrated can in embodiments be plural or distributed, and resources described as multiple or distributed can in embodiments be combined. The scope of the present teachings is accordingly intended to be limited only by the following claims.

What is claimed is:

1. A print management system, comprising;
   a multifunction device, the multifunction device being configured with
      an interface configured to display information to a user, and
      a processor coupled to the interface and configured to:
         provide, via the interface, an indication of a document submitted to the multifunction device by the user, and an indication of a networked document submitted to an additional multifunction device by the user,
         receive, from the user, a request to print the networked document at the multifunction device,
         send an identification of the networked document to an application server in response to receiving the request, wherein the application server requests, using the identification, the additional multifunction device to forward the networked document to the multifunction device;
         receive, from the additional multifunction device, the networked document, and
         print, at the multifunction device, the networked document that was received.

2. The system of claim 1, wherein the application server is accessed over a network.

3. The system of claim 1, wherein the processor is further configured to:

process an attempt by the user to log into the multifunction device.

4. The system of claim 1, wherein a PIN associates the user with the document and the networked document.

5. The system of claim 1, wherein the processor is further configured to provide, via the interface, additional indications of additional documents submitted to the multifunction device by the user, and additional indications of additional networked documents submitted to the additional multifunction device by the user.

6. The system of claim 1, wherein the processor is further configured to:
   receive, from the user, a request to transmit the document to the additional multifunction device, and
   transmit, via the application server, the document to the additional multifunction device in response to receiving the request.

7. A method of managing printing, comprising:
   processing a login by a user at a user interface of a multifunction device;
   providing, via the user interface, an indication of a document submitted to the multifunction device by the user, and an indication of a networked document submitted to an additional multifunction device by the user;
   receiving, from the user, a request to print the networked document at the multifunction device;
   sending an identification of the networked document to an application server in response to receiving the request, wherein the application server requests, using the identification, the additional multifunction device to forward the networked document to the multifunction device;
   receiving, from the additional multifunction device, the networked document, and
   printing, at the multifunction device, the networked document that was received.

8. The method of claim 7, further comprising:
   receiving, from the user, a request to print the document at the multifunction device;
   printing the document at the multifunction device in response to receiving the request.

9. The method of claim 7, further comprising:
   receiving, from the user, a request to transmit the document to the additional multifunction device; and
   transmitting, via the application server, the document to the additional multifunction device in response to receiving the request.

10. The method of claim 7, further comprising:
    storing the document and the networked document on at least one of the multifunction device or the additional multifunction device.

11. The method of claim 7, wherein processing the login by the user comprises:
    receiving a PIN entered by the user into the user interface of the multifunction device.

12. The method of claim 7, further comprising:
    providing, via the user interface, additional indications of additional documents submitted to the multifunction device by the user, and additional indications of additional networked documents submitted to the additional multifunction device by the user.

\* \* \* \* \*